United States Patent
Banerjea et al.

(10) Patent No.: US 8,923,847 B2
(45) Date of Patent: *Dec. 30, 2014

(54) APPARATUS AND METHOD FOR COMMUNICATING WITH AN ACCESS POINT VIA A COMPONENT SHARED BY MULTIPLE CLIENT MODULES

(71) Applicant: Marvell World Trade Ltd., St. Michael (BB)

(72) Inventors: Raja Banerjea, Sunnyvale, CA (US);
Sandesh Goel, Fremont, CA (US);
Milind Kopikare, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,656

(22) Filed: Dec. 10, 2013

(65) Prior Publication Data
US 2014/0105090 A1 Apr. 17, 2014

Related U.S. Application Data

(63) Continuation of application No. 13/730,144, filed on Dec. 28, 2012, now Pat. No. 8,606,263, which is a continuation of application No. 13/346,283, filed on Jan. 9, 2012, now Pat. No. 8,345,652, which is a continuation of application No. 11/586,859, filed on Oct. 26, 2006, now Pat. No. 8,094,631.

(60) Provisional application No. 60/808,077, filed on May 24, 2006, provisional application No. 60/748,937, filed on Dec. 9, 2005.

(51) Int. Cl.
| | |
|---|---|
| H04B 1/16 | (2006.01) |
| H04B 7/00 | (2006.01) |
| H04B 7/212 | (2006.01) |
| H04W 4/00 | (2009.01) |
| H04W 36/30 | (2009.01) |
| H04W 76/02 | (2009.01) |
| H04W 72/04 | (2009.01) |
| H04W 28/04 | (2009.01) |
| H04W 52/02 | (2009.01) |
| H04W 88/06 | (2009.01) |
| H04W 92/20 | (2009.01) |
| H04W 84/12 | (2009.01) |
| H04W 92/02 | (2009.01) |

(52) U.S. Cl.
CPC .......... *H04W 72/0446* (2013.01); *H04W 28/04* (2013.01); *H04W 36/30* (2013.01); *H04W 52/0238* (2013.01); *H04W 88/06* (2013.01); *H04W 92/20* (2013.01); *H04W 76/026* (2013.01); *H04W 52/0225* (2013.01); *H04W 84/12* (2013.01); *H04W 92/02* (2013.01); *H04W 52/0212* (2013.01)
USPC .......... 455/426; 370/331; 370/328; 455/336; 455/500

(58) Field of Classification Search
CPC . H04W 84/12; H04W 92/02; H04W 52/0212; H04W 36/00
USPC .................. 370/331, 328, 329; 455/436–442, 455/67.13, 41.2, 552.1, 552.3
See application file for complete search history.

(56) References Cited

U.S. PATENT DOCUMENTS

| | | | |
|---|---|---|---|
| 6,931,249 B2 | 8/2005 | Fors et al. | |
| 7,468,963 B2 | 12/2008 | Capretta | |

(Continued)

OTHER PUBLICATIONS 802.11n; IEEE P802.11-04/0889r6; Wireless LANs, TGn Sync Proposal Technical Specification; 131 pages.

(Continued)

*Primary Examiner* — Nizar Sivji

(57) ABSTRACT

A network interface including a radio frequency system with a component configured for communication with an access point. First, second and third client modules communicate with the access point according to respective wireless communication standards. The first, second and third client modules share the component, such that during respective periods the first, second and third client modules communicate with the access point via the component. The first client module transmits a request signal to the second client module while the second client module is in an idle state and the third client module is in an active state. The request signal requests access to the component. The third client module, in response to the request signal, aborts transmitting of first data to the access point and transmits an acknowledgement signal. The first client module transmits to or receives from the access point second data based on the acknowledgement signal.

17 Claims, 12 Drawing Sheets

FIG. 1

(56) References Cited

U.S. PATENT DOCUMENTS

| | | |
|---|---|---|
| 2003/0125019 A1 | 7/2003 | Bajikar |
| 2004/0048577 A1 | 3/2004 | Godfrey |
| 2004/0185857 A1 | 9/2004 | Lee et al. |
| 2005/0041787 A1 | 2/2005 | Casey et al. |
| 2005/0237992 A1 | 10/2005 | Mishra et al. |
| 2006/0003802 A1 | 1/2006 | Sinai |
| 2007/0109995 A1 | 5/2007 | Quigley et al. |
| 2007/0153736 A1 | 7/2007 | Mow et al. |
| 2008/0013489 A1 | 1/2008 | Anigstein et al. |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

IEEE Std 802.16-2001 IEEE Standard for Local and metropolitan area networks; Part 16: Air Interface for Fixed Broadband Wireless Access Systems; IEEE Computer Society and the IEEE Microwave Theory and Techniques Society; Apr. 8, 2002; 349 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.16a (Amendment to IEEE Std 802.16-2001) IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; IEEE Computer Society and the IEEE Microwave Theory and Techniques Society; Apr. 1, 2003; 316 pages.

PCT Notification of Transmittal of the International Search Report and the Written Opinion of the International Searching Authority dated May 14, 2007 for Application No. PCT/US2006/046986; 10 pages.

Specification of the Bluetooth System Master Table of Contents & Compliance Requirements; Covered Core Package version: 2.0 + EDR Current Master TOC issued: Nov. 4, 2004; pp. 1-72; pp. 1-92; pp. 1-812.

APPARATUS AND METHOD FOR COMMUNICATING WITH AN ACCESS POINT VIA A COMPONENT SHARED BY MULTIPLE CLIENT MODULES

CROSS-REFERENCE TO RELATED APPLICATIONS

This application is a continuation of U.S. patent application Ser. No. 13/730,144 (now U.S. Pat. No. 8,606,263), filed Dec. 28, 2012, which is a continuation of U.S. patent application Ser. No. 13/346,283 (now U.S. Pat. No. 8,345,652), filed Jan. 9, 2012, which is a continuation of Ser. No. 11/586,859 (now U.S. Pat. No. 8,094,631), filed on Oct. 26, 2006, which claims the benefit of U.S. Provisional Application Nos. 60/748,937, filed on Dec. 9, 2005 and 60/808,077, filed on May 24, 2006. The entire disclosures of the applications referenced above are incorporated herein by reference.

FIELD

The present disclosure relates to wireless network devices, and more particularly to a coexistence system for wireless network devices having multiple wireless sub-clients that share components.

BACKGROUND

In a Wireless Local Area Network (WLAN), client stations can communicate with other client stations in an ad hoc mode or with an access point (AP) in an infrastructure mode. WLANs typically have a range in the hundreds of feet. The client stations typically include a wireless network interface that is associated with a host device. The host device can be a desktop computer, a personal digital assistant (PDA), a mobile phone, a laptop, a personal computer (PC), a printer, a digital camera, an internet protocol (IP) phone, etc. The AP provides connectivity to a network, such as the Internet or other network.

The wireless network interface may be compatible with Worldwide Interoperability for Microwave Access (WiMAX). WiMAX systems schedule communications with client stations by allocating a time slot. Initially, the client station registers with a base station. The base station transmits MAPs that indicate when the client station should transmit and receive data. When the WiMAX client does not transmit or receive data during the regularly scheduled MAP, the base station may deregister the client. Bluetooth is another wireless standard that operates at shorter ranges than WLAN.

When implemented by the same device, WiMAX, WLAN, and Bluetooth clients may share components to reduce the cost of the device. Shared components may include the antenna, radio frequency (RF) subsystems, such as transmitters and receivers, baseband processors, etc. The sharing of components should be coordinated. Further, WiMAX, WiFi, and Bluetooth may use the same frequency or nearby frequencies, which may cause interference.

SUMMARY

A network interface is provided and includes a radio frequency system with a component configured for communication with an access point. First, second and third client modules communicate with the access point according to respective wireless communication standards. The first, second and third client modules share the component, such that during respective periods the first, second and third client modules communicate with the access point via the component. The first client module transmits a request signal to the second client module while the second client module is in an idle state and the third client module is in an active state. The request signal requests access to the component. The third client module, in response to the request signal, aborts transmitting of first data to the access point and transmits an acknowledgement signal. The first client module transmits to or receives from the access point second data based on the acknowledgement signal.

In other features, a network interface is provided and includes a radio frequency system connected to an antenna and a media access controller. The media access controller includes client modules and a control module. The client modules include a first client module and a second client module. Each of the client modules wirelessly communicates with a network via (i) the radio frequency system and (ii) the antenna. Each of the client modules is controllable to be in an active state or a sleep state. The control module is configured to (i) determine a first priority level of the first client module, and (ii) determine a second priority level of the second client module. The control module is also configured to, based on the first priority level and the second priority level, (i) control the first client module to be in the active state to permit communication between the first client module and the radio frequency system, and (ii) control the second client module to be in the sleep state to prevent communication between the second client module and the radio frequency system.

A wireless network interface includes a component, a first sub-client module that operates using a first wireless protocol, and a second sub-client module that operates using a second wireless protocol. The first and second wireless protocols are different. The first and second sub-client modules share use of the component. A component sharing control module selectively transitions the first sub-client module into and out of a state to allow the second sub-client module to use the component during the state.

In another feature, at least one of the first sub-client module and the second sub-client module includes an active sub-client. At least one of the first sub-client module and the second sub-client module includes at least one of a Worldwide Interoperability for Microwave Access (WiMAX) sub-client module, a Wireless Local Area Network (WLAN) sub-client module, and a Bluetooth sub-client module.

In other features, the state includes a sleep state. The first sub-client module sends a signal to the second sub-client module indicating the first sub-client module is entering the sleep state. At least one of the first sub-client module and the component sharing control module prevents the second sub-client module from using the component within a predetermined time in which the first sub-client module is scheduled to receive a transmission.

In other features, the component includes at least one of an antenna and a radio frequency (RF) subsystem. The RF subsystem includes at least one of a filter, a switch, a transmitter (Tx), a receiver (Rx), and a base band processor (BBP) module. The first sub-client module selectively reduces signal power to decrease signal interference with signals from the second sub-client module.

In other features, at least one of the first sub-client module and the component sharing control module prevents the second sub-client module from receiving transmissions within a predetermined time in which the first sub-client module is scheduled to receive a transmission. The state includes at least one of an idle state and a low power state.

In still other features, the first sub-client module includes a WiMAX sub-client module and the second sub-client module includes a WLAN sub-client module. The WLAN sub-client module transmits a reserve signal to the component sharing control module to reserve the component for a duration of time when the WiMAX sub-client module is due to receive a MAP. The reserve signal includes a CTS-Self protocol. The WLAN sub-client module receives transmissions from a network. The WLAN sub-client module sends transmissions to a network.

In other features, a system includes the wireless network interface and a base station that communicates with a network. The WiMAX sub-client module transmits a busy signal to the base station during WLAN sub-client module use of the component.

In other features, a system includes the wireless network interface. The WLAN sub-client module detects a WiMAX signal through at least one of a repeated MAP transmission and a signal from the WiMAX sub-client module. The system further includes a first access point (AP) for the WLAN sub-client module. The WLAN sub-client module informs the first AP of interference with the WiMAX signal and that the first AP should switch transmission channels. The WLAN sub-client module scans for a second AP.

In still other features, the first sub-client module includes a WLAN sub-client module and the second sub-client module includes a WiMAX sub-client module. The component includes radio frequency (RF) subsystems that selectively switch from a WLAN frequency to a WiMAX frequency during the state. The WLAN sub-client module periodically receives signals during the state. At least one of the periodic signals is skipped when the WiMAX sub-client module is due to receive signals. The component sharing control module selectively determines the state with a base station when WLAN sub-client module network connection quality is above a WLAN network disconnect threshold. The base station communicates with the WiMAX sub-client module. The component sharing control module includes a medium access control module (MAC).

In other features, a system includes the wireless network interface and further includes access points (AP) and base stations. The MAC includes a mobility manager module that selectively connects the first sub-client module and the second sub-client module to each of the APs and base stations. The MAC further includes a coexistence control module that controls states of the first sub-client module and the second sub-client module. The states comprise idle, scan, network entry, registered, and active. The coexistence control module determines which of the first sub-client and the second sub-client has priority for the component and controls the selective transitions based on the priority.

In still other features, a wireless network interface method includes operating a first sub-client module using a first wireless protocol and operating a second sub-client module using a second wireless protocol. The first and second wireless protocols are different. The first and second sub-client modules share use of component. The method selectively transitions the first sub-client module into and out of a state to allow the second sub-client module to use the component during the state.

In a wireless network interface method, at least one of the first sub-client module and the second sub-client module includes an active sub-client. At least one of the first sub-client module and the second sub-client module includes at least one of a WiMAX sub-client module, a WLAN sub-client module, and a Bluetooth sub-client module. In the wireless network interface method, selectively transitioning the first sub-client module into and out of the state includes selectively transitioning the first sub-client module into and out of a sleep state.

In other features, the first sub-client module sends a signal to the second sub-client module indicating the first sub-client module is entering the sleep state. The wireless network interface method further includes preventing the second sub-client module from using the component within a predetermined time in which the first sub-client module is scheduled to receive a transmission. The component includes at least one of an antenna and an RF subsystem.

In other features, the RF subsystem includes at least one of a filter, a switch, a Tx, an Rx, and a BBP module. The wireless network interface method further includes selectively reducing signal power to decrease signal interference with signals from the second sub-client module. The wireless network interface method further includes preventing the second sub-client module from receiving transmissions within a predetermined time in which the first sub-client module is scheduled to receive a transmission. Selectively transitioning the first sub-client module into and out of the state includes selectively transitioning the first sub-client module into and out of at least one of an idle state and a low power state.

In other features, the first sub-client module includes a WiMAX sub-client module and the second sub-client module includes a WLAN sub-client module. The wireless network interface method further includes transmitting a reserve signal to the component sharing control module. The method also includes reserving the component for a duration of time when the WiMAX sub-client module is due to receive a MAP. For the wireless network interface method, the reserve signal includes a CTS-Self protocol. The WLAN sub-client module receives transmissions from a network. The WLAN sub-client module sends transmissions to a network, and a base station communicates with the network. The WiMAX sub-client module transmits a busy signal to the base station during WLAN sub-client module use of the component.

In other features, the wireless network interface method further includes detecting a WiMAX signal through at least one of a repeated MAP transmission and a signal from the WiMAX sub-client module. The method further includes informing the first AP of interference with the WiMAX signal and that the first AP should switch transmission channels. The method further includes scanning for a second AP.

In still other features, the first sub-client module includes a WLAN sub-client module and the second sub-client module includes a WiMAX sub-client module. The wireless network interface method further includes selectively switching from a WLAN frequency to a WiMAX frequency during the state. The wireless network interface method further includes the WLAN sub-client module periodically receiving signals during the state. The wireless network interface method further includes skipping at least one of the periodic signals when the WiMAX sub-client module is due to receive signals. The wireless network interface method further includes selectively determining the state with a base station when WLAN sub-client module network connection quality is above a WLAN network disconnect threshold.

In other features, the component sharing control module includes a medium MAC. The wireless network interface method further includes a mobility manager module within the MAC selectively connecting the first sub-client module and the second sub-client module to each of multiple APs and base stations. The method further includes a coexistence control module within the MAC controlling states of the first sub-client module and the second sub-client module. The states include idle, scan, network entry, registered, and active.

The method further includes determining which of the first sub-client and the second sub-client has priority for the component, and controlling the selective transitions based on the priority.

In still other features, a wireless network interface includes a component for interacting with a network. The interface includes first sub-client module for operating with a first wireless protocol and second sub-client module for operating with a second wireless protocol. First and second wireless protocols are different. The first and second sub-client module share use of the component. The interface also includes component sharing module for selectively transitioning the first sub-client module into and out of a state to allow the second sub-client module to use the component during the state.

In other features, at least one of the first sub-client module and the second sub-client module is active. At least one of the first sub-client module and the second sub-client module includes at least one of sub-client module for using WiMAX, sub-client module for using WLAN, and sub-client module for using Bluetooth.

In other features, the state includes a sleep state. The first sub-client module sends a signal to the second sub-client module indicating the first sub-client module is entering the sleep state. At least one of the first sub-client module and the component sharing module prevents the second sub-client module from using the component within a predetermined time. The predetermined time is the duration during which the first sub-client module is scheduled to receive a transmission.

The component includes at least one of antenna for receiving signals and RF subsystem for processing the signals. The RF subsystem includes at least one of filter for filtering the signals, switch for forwarding the signals, transmitter for transmitting the signals, receiver for receiving the signals, and base band processor for processing a base band of the signals. The first sub-client module selectively reduces signal power to decrease signal interference with signals from the second sub-client module.

At least one of the first sub-client module and the component sharing module prevents the second sub-client module from receiving transmissions within a predetermined time in which the first sub-client module is scheduled to receive a transmission. The state includes at least one of an idle state and a low power state.

The first sub-client module includes sub-client module for using WiMAX and the second sub-client module includes sub-client module for using a WLAN. The WLAN sub-client module transmits a reserve signal to the component sharing module to reserve the component for a duration of time when the WiMAX sub-client module is due to receive a MAP. The reserve signal includes a CTS-Self protocol. The WLAN sub-client module receives transmissions from network for communicating between devices. The WLAN sub-client module sends transmissions to the network.

In other features, a system includes the wireless network interface. The system also includes a base station for communicating with the network. The WiMAX sub-client module transmits a busy signal to the base station during WLAN sub-client module use of the component.

In other features, the WLAN sub-client module detects a WiMAX signal through at least one of a repeated MAP transmission and a signal from the WiMAX sub-client module. The system further includes a first AP for accessing the network for the WLAN sub-client module. The WLAN sub-client module informs the first AP of interference with the WiMAX signal and that the first AP should switch transmission channels. The WLAN sub-client module scans for a second AP for accessing the network.

In still other features, the first sub-client module includes sub-client module for operating WLAN and the second sub-client module includes sub-client module for operating WiMAX. The component includes radio frequency (RF) subsystems that selectively switch from a WLAN frequency to a WiMAX frequency during the state. The WLAN sub-client module periodically receives signals during the state. At least one of the periodic signals is skipped when the WiMAX sub-client module is due to receive signals. The component sharing module selectively determines the state with base station for communicating with the network when network connection quality for the WLAN sub-client module is above a WLAN network disconnect threshold. The base station communicates with the WiMAX sub-client module. The component sharing module includes a MAC for accessing the network.

In other features, a system includes the wireless network interface and further includes APs for accessing the network and base station for accessing the network. The MAC includes mobility manager module for selectively connecting the first sub-client module and the second sub-client module to each of the APs and the base station. The MAC further includes coexistence control module for controlling states of the first sub-client module and the second sub-client module. The states include idle, scan, network entry, registered, and active. The coexistence control module determines which of the first sub-client module and the second sub-client module has priority for the component and controls the selective transitions based on the priority.

In still other features, a computer program stored for use by a processor for operating a wireless network interface includes operating a first sub-client module using a first wireless protocol and operating a second sub-client module using a second wireless protocol. The first and second wireless protocols are different. The first and second sub-client modules share use of a component. The computer program selectively transitions the first sub-client module into and out of a state to allow the second sub-client module to use the component during the state.

In other features, at least one of the first sub-client module and the second sub-client module includes an active sub-client. At least one of the first sub-client module and the second sub-client module includes at least one of a WiMAX sub-client module, a WLAN sub-client module, and a Bluetooth sub-client module. In the computer program, selectively transitioning the first sub-client module into and out of the state includes selectively transitioning the first sub-client module into and out of a sleep state.

In other features, the first sub-client module sends a signal to the second sub-client module indicating the first sub-client module is entering the sleep state. The computer program further includes preventing the second sub-client module from using the component within a predetermined time in which the first sub-client module is scheduled to receive a transmission. The component includes at least one of an antenna and a radio frequency (RF) subsystem.

In other features, the RF subsystem includes at least one of a filter, a switch, a Tx, an Rx, and a BBP module. The computer program further includes selectively reducing signal power to decrease signal interference with signals from the second sub-client module. The computer program further includes preventing the second sub-client module from receiving transmissions within a predetermined time in which the first sub-client module is scheduled to receive a transmission. The computer program selectively transitions the first sub-client module into and out off at least one of an idle state and a low power state.

In other features, the first sub-client module includes a WiMAX sub-client module and the second sub-client module includes a WLAN sub-client module. The computer program further includes transmitting a reserve signal to the component sharing control module. The computer program also reserves the component for a duration of time when the WiMAX sub-client module is due to receive a MAP. The reserve signal includes a CTS-Self protocol.

In other features, the WLAN sub-client module receives transmissions from a network, and the WLAN sub-client module sends transmissions to a network. A base station communicates with a network, and the WiMAX sub-client module transmits a busy signal to the base station during WLAN sub-client module use of the component.

In other features, the computer program further includes detecting a WiMAX signal through at least one of a repeated MAP transmission and a signal from the WiMAX sub-client module. The computer program further includes informing the first AP of interference with the WiMAX signal and that the first AP should switch transmission channels. The computer program further includes scanning for a second AP.

In other features, the first sub-client module includes a WLAN sub-client module and the second sub-client module includes a WiMAX sub-client module. The computer program further includes selectively switching from a WLAN frequency to a WiMAX frequency during the state. The computer program further includes the WLAN sub-client module periodically receiving signals during the state. The computer program further includes skipping at least one of the periodic signals when the WiMAX sub-client module is due to receive signals. The computer program further includes selectively determining the state with a base station when WLAN sub-client module network connection quality is above a WLAN network disconnect threshold.

In other features, the component sharing control module includes a medium MAC. The computer program further includes selectively connecting the first sub-client module and the second sub-client module to each of multiple APs and base stations. The computer program further includes controlling states of the first sub-client module and the second sub-client module. The states include idle, scan, network entry, registered, and active. The computer program further includes determining which of the first sub-client and the second sub-client has priority for the component and controlling the selective transitions based on the priority.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
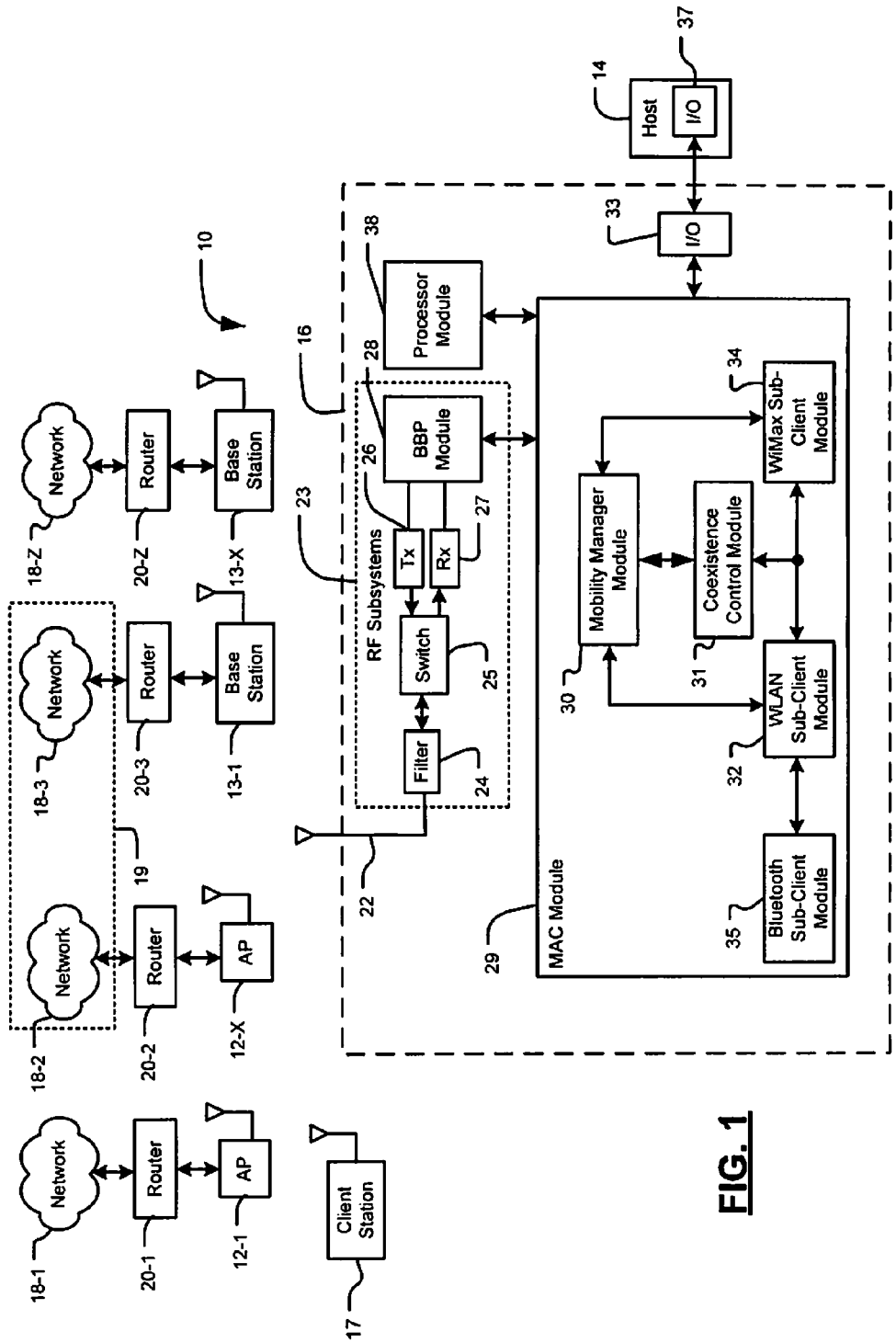
FIG. 1 is a functional block diagram of a coexistence system for wireless network devices.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure includes a coexistence system and method for wireless network devices with wireless network interfaces that support a variety of sub-clients including, for example, a Wireless Local Area Network (WLAN) sub-client, a Worldwide Interoperability for Microwave Access (WiMAX) sub-client, and a Bluetooth (BT) sub-client, which share components.

Referring now to FIG. 1, a coexistence system 10 for wireless network devices having multiple sub-clients that share components is shown. Wireless access points (AP) 12-1, 12-2, ..., and 12-X (collectively APs 12) and/or base stations 13-1, 13-2, ..., and 13-X (collectively base stations 13) provide connections between a host 14 having a wireless network interface 16 and networks 18-1, 18-2, ..., and 18-Z, that may include the Internet 19. The APs 12 and base stations 13 may communicate with the networks through associated routers 20-1, 20-2, and 20-Z. The wireless network interface 16 communicates with the APs 12, the base stations 13 and/or other wireless client stations 17. The host 14 may be a personal digital assistant (PDA), mobile phone, laptop, personal computer (PC), printer, digital camera, or internet protocol (IP) phone.

The wireless network interface 16 may include shared components such as an antenna 22, radio frequency (RF) subsystems 23 (such as a filter 24, a switch 25, a transmitter (Tx) 26, a receiver (Rx) 27, and/or a base band processor (BBP) module 28). Further, each sub-client may include an antenna, a filter, a switch, a Tx, an Rx, and/or a BBP module. The wireless communications can be compliant with various protocols including at least one of the Institute of Electrical and Electronics Engineers (IEEE) standards 802.11, 802.11a, 802.11b, 802.11g, 802.11h, 802.11n, 802.16, 802.16a, 802.16e, 802.16-2004, and 802.20, and/or the Bluetooth standard published by the Bluetooth Special Interest Group (SIG). The aforementioned standards are hereby incorporated by reference in their entirety.

The antenna 22 and RF subsystems 23 communicate with a media access control module (MAC) 29, which is also referred to herein as a component sharing control module. The MAC 29 may include a mobility manager module 30 that receives information about the availability and signal strength of the APs 12 and/or base stations 13. The mobility manager module 30 also selects one of the sub-clients to connect to the appropriate AP 12 and/or base station 13 and informs a coexistence control module 31. Illustrated are a WLAN (WiFi) sub-client module 32, a WiMAX sub-client module 34, and/or a Bluetooth sub-client module 35. The MAC 29 communicates with the host 14 through I/O modules 33, 37 and also communicates with a processor module 38, which may perform processing for the network interface 16.

The WLAN, WiMAX, and Bluetooth sub-client modules 32, 34, 35 may be in various states or modes, such as, but not limited to, idle, scan, network entry, registered, and active. These states may be controlled by the coexistence control module 31 or the sub-client modules 32, 34. When in the idle state, a sub-client module 32, 34 is not connected to an AP or base station and is also not scanning. When in the scan state, the sub-client module 32, 34 is not connected to an AP or base station but is receiving beacons or MAPs. When in the network entry state, the sub-client module 32, 34 has identified an AP or base station and is in the process of undergoing network entry to register with the AP or base station. When in the registered state, the sub-client module 32, 34 has completed network entry and has registered to the AP or base station but is not passing user data. When in the active state, the sub-client module 32, 34 is passing user data. When multiple wireless access devices are in a single handheld device, the coexistence control module 31 limits network entry to one sub-client module at a time. Further, the sub-client modules 32, 34 can transition to any other states independently to avoid simultaneous active state interference. Regardless of the state, when transmitting and/or receiving, the sub-client module may require use of shared components (antenna, RF subsystem, etc.).

In each state, the power save properties, transmission, and reception requirements are different. In the idle state, both the transmitter and receiver are inactive; and the sub-client module is consuming very low power. In the low power state, which may be any state other than active and idle states, the sub-client module is transmitting or receiving data at a very low rate or not at all. In the active state, the sub-client module is actively transmitting and receiving data. Further, the sub-client modules may enter a sleep state that may include temporarily entering an idle state or a low power state.

Figure 2:
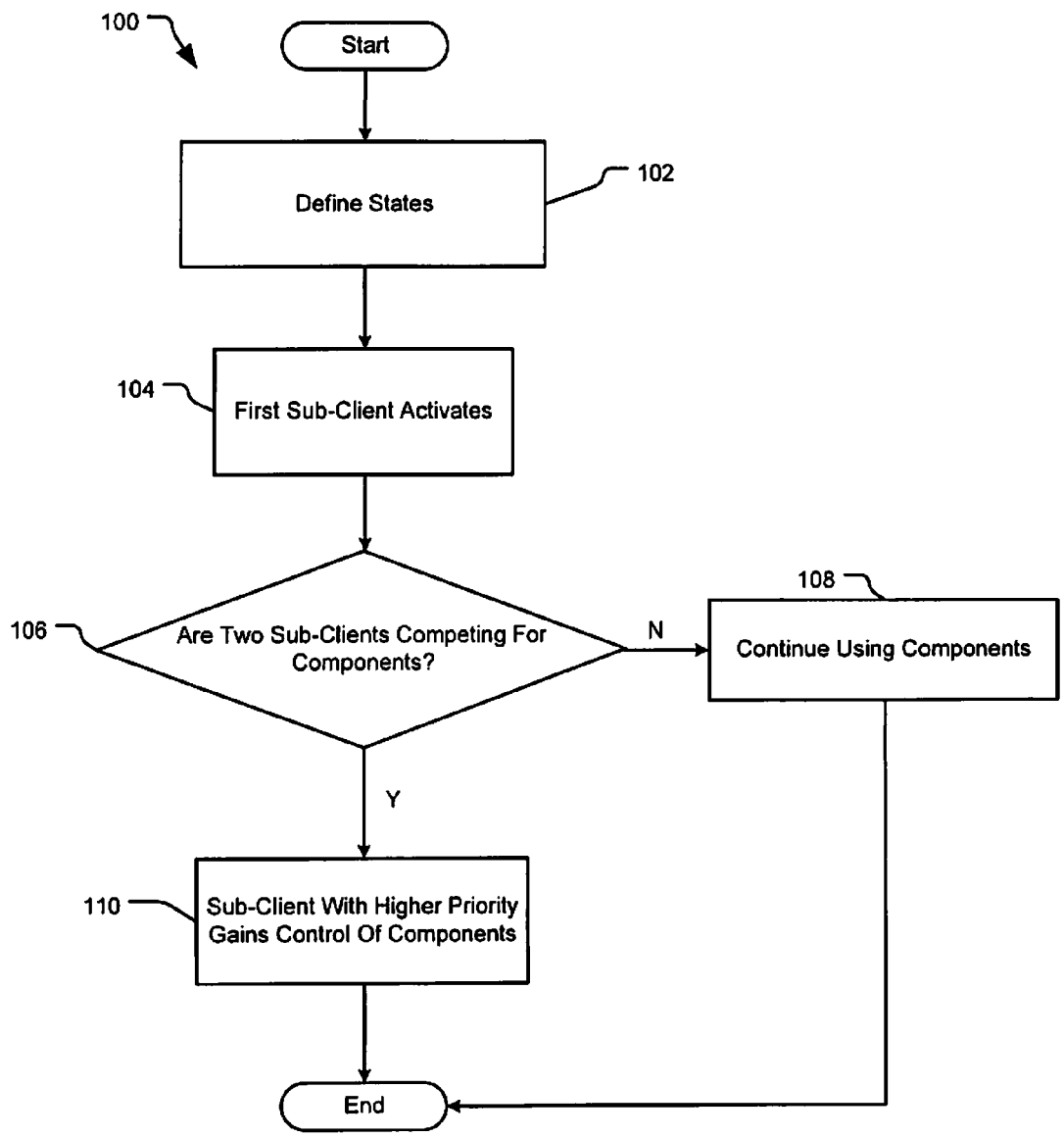
FIG. 2 is a sequence diagram illustrating a method for sharing components.

Referring now to FIG. 2, a method 100 for operating the coexistence control module 31 is illustrated. In step 102, the coexistence control module 31 may define a state of each sub-client module to indicate the activation state of the sub-client module (idle, low power, active) and a priority of the sub-client module for component priority. The component priority may depend on the type of data (voice, non voice, management message etc.) to be transmitted. In step 104, a first sub-client module may activate (change state to active) when all other sub-clients are idle. In step 106, the first sub-client module rechecks the state of other sub-clients to verify that no race (i.e. two sub-client modules attempting to use shared components) condition exists. If no other sub-client is competing for the components, in step 108, the first sub-client module continues using the shared components. Otherwise, in step 110, the sub-client with higher priority gains access to the shared components.

Figure 3:
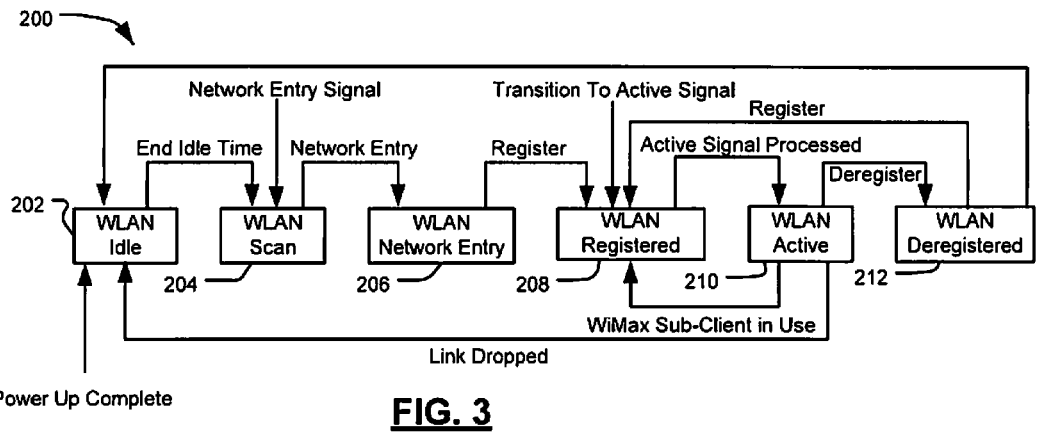
FIG. 3 is a state transition diagram for a WLAN sub-client.

Referring now to FIG. 3, a state transition diagram 200 for a WLAN sub-client module 32 is illustrated. In state 202, after receiving a power up complete signal, the WLAN sub-client module 32 enters an idle state for a predetermined amount of time (or until commanded to scan by the host 14) prior to scanning. In state 204, the WLAN sub-client module 32 enters a scan state to scan for available APs until the coexistence control module 31 commands the WLAN sub-client module 32 to perform network entry with an appropriate AP. In state 206, the WLAN sub-client module 32 enters the network.

In state 208, after registering with the AP, the WLAN sub-client module 32 enters into a low power state maintaining the connection with the AP but not passing data to the AP. In state 210, when informed by the coexistence control module 31, the WLAN sub-client module 32 transitions to the active state to pass user data to the AP. If the WiMAX sub-client module 34 is used for data, the coexistence control module 31 transitions the WLAN sub-client module 32 to a low power state, e.g., a registered state, as in state 208. If the WLAN link drops, the WLAN sub-client module 32 goes back to the idle state, as in state 202. In state 212, the WLAN sub-client module 32 or the AP can deregister the WLAN sub-client module 32. The WLAN sub-client module 32 can return to the registered state as in state 208. The WLAN sub-client module 32 can also return to the idle state, as in state 202, and then scan for available APs.

Figure 4:
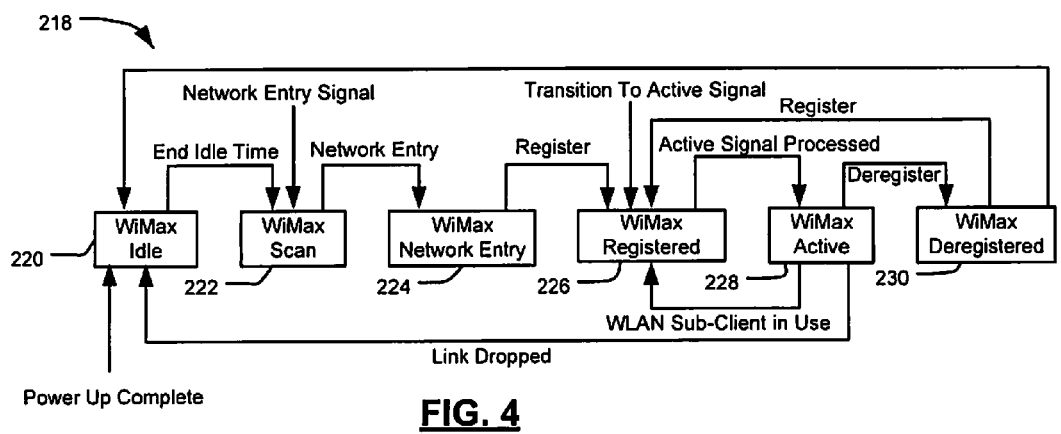
FIG. 4 is a state transition diagram for a WiMAX sub-client.

Referring now to FIG. 4, a state transition diagram 200 for a WiMAX sub-client module 34 is illustrated. In state 220, after receiving a power up complete signal, the WiMAX sub-client module 34 enters an idle state for a predetermined amount of time (or until commanded to scan by the host 14) prior to scanning. In state 222, the WiMAX sub-client module 34 enters a scan state to scan for available base stations until the coexistence control module 31 commands the WiMAX sub-client module 34 to enter the network. In state 224, the WiMAX sub-client module 34 enters the network.

In state 226, after registering with the base station, the WiMAX sub-client module 34 enters into a low power state maintaining the connection with the base station but not passing data to the base station. In state 228, when informed by the coexistence control module 31, the WiMAX sub-client module 34 transitions to the active state to pass user data to the base station. If the WLAN sub-client module 32 is used for user data, the coexistence control module 31 transitions the WiMAX sub-client module 34 to a registered state, as in state 226. If the WiMAX link drops, the WiMAX sub-client module 34 goes back to the idle state, as in state 220. In state 230, the WiMAX sub-client module 34 or the base station can deregister the WiMAX sub-client module 34. The WiMAX sub-client module 34 can return to the registered state as in state 226. The WiMAX sub-client module 34 can also return to the idle state, as in state 218, and then scan for available base stations.

Figure 5:
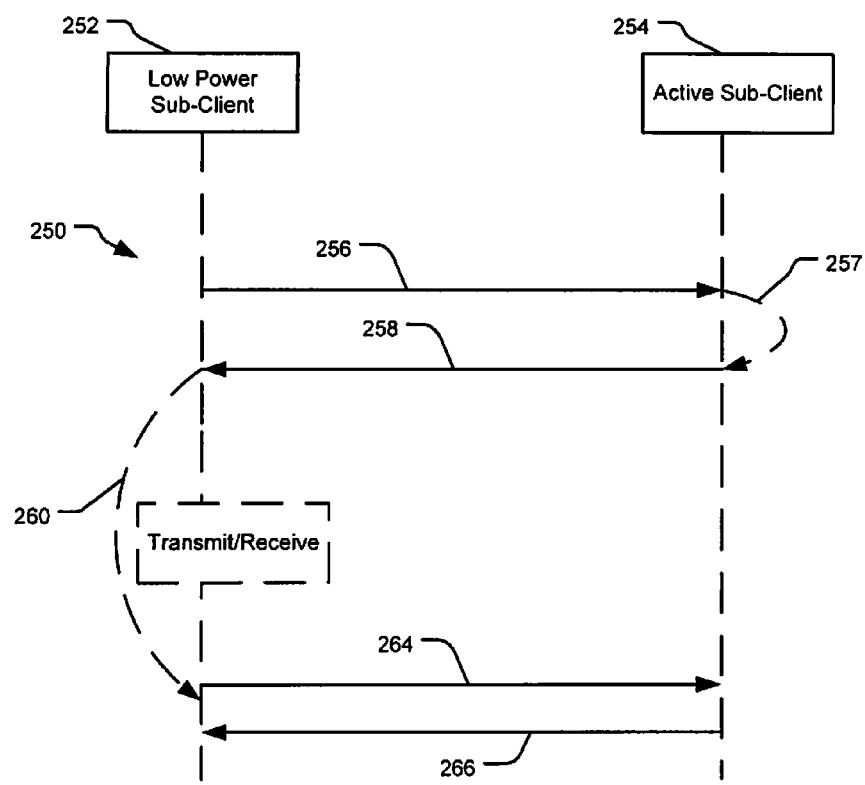
FIG. 5 is a sequence diagram illustrating a method for sharing components.

Referring now to FIG. 5, a sequence diagram 250 of a method for sharing components between a low power sub-client 252 and an active sub-client 254 is illustrated. Either or both the low power and active sub-clients may be WiMAX, WLAN, and/or Bluetooth sub-clients. When the low power sub-client 252 requires network interaction, the low power sub-client 252 sends a request 256 to the active sub-client 254 for the shared components. The active sub-client 254 complies with the request 256, which may include acknowledging pending automatic repeat request (ARQ) packets, informing the AP that the active sub-client 254 will enter a sleep state for a fixed duration, etc. Within a predetermined time 257, the active sub-client 254 sends an acknowledge signal 258 (ACK). The low power sub-client 252 then performs the intended functions (e.g., transmitting or receiving on the shared components.) and, within a predetermined expiration time 260, sends a transmit/receive completed message 264 to the active sub-client 254. The active sub-client 254 then responds with an acknowledge signal 266. The messages 256, 258, 264, 266 can be sent through a set of registers or shared memory within the host 14. The sub-clients 252, 254 can also use either polling during a common time base or alternately interrupt requests (IRQ) to send and receive the messages 256, 258, 264, 266.

In an alternate example, two sub-clients may be in a low power state. When the first low power sub-client requires the shared components, an interrupt is sent by either the first low power sub-client or the coexistence control module to the second low power sub-client, which activates to service the interrupt. The first low power sub-client can check the status of the second low power sub-client, and when the second low power sub-client is active, the sub-clients may follow the sequence diagram, as shown in FIG. 5. When the second low power sub-client is in low power state, the first low power sub-client may take control of the shared components. After completing a transmit/receive, the first low power sub-client may relinquish control of the shared components.

In an exemplary embodiment, if the WLAN client knows when the WiMAX client is expecting a MAP, it can transmit a CTS-Self reserving the medium for a fixed duration of time. The WiMAX client can then receive the MAP without WLAN interference. This feature may be applied to ensure reception of all downlink or uplink transmissions.

Figure 6:
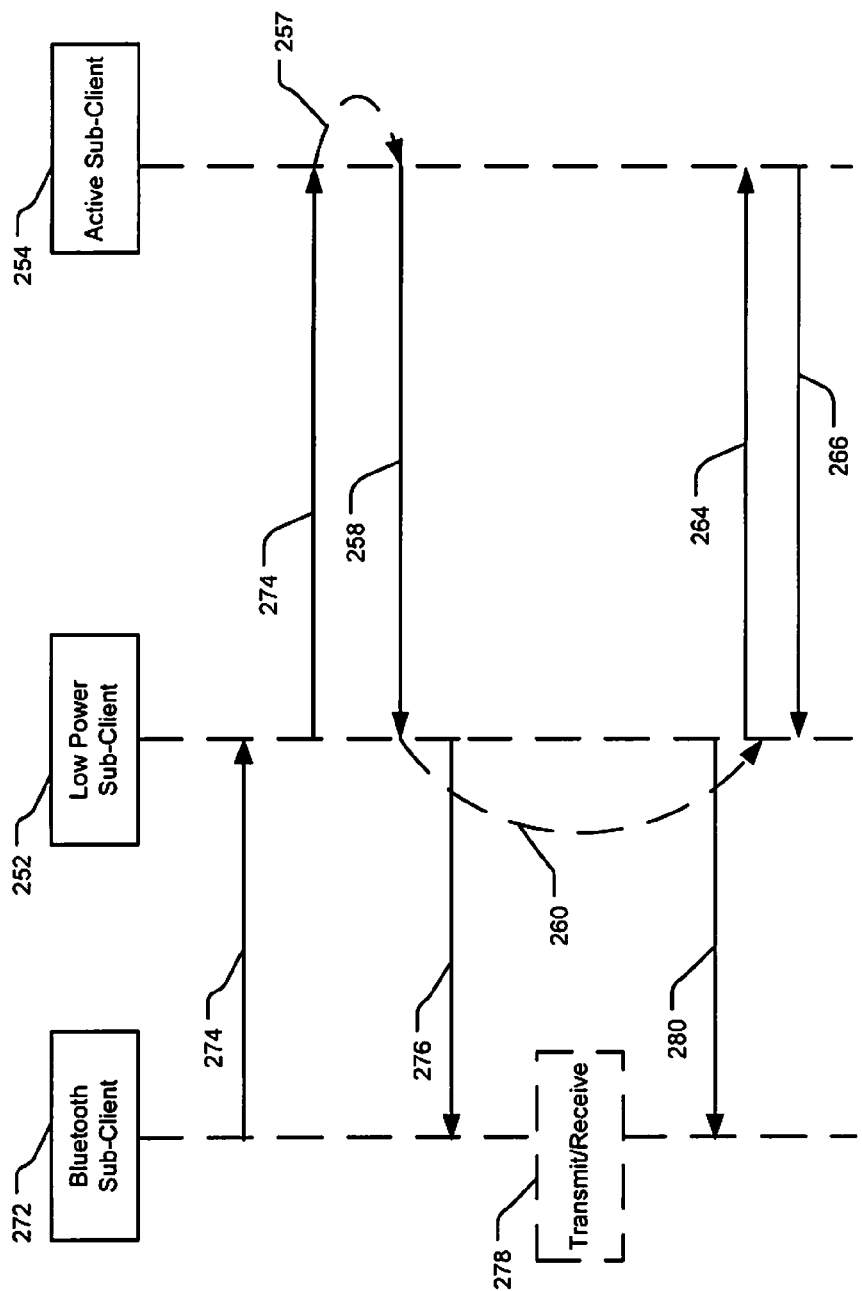
FIG. 6 is a sequence diagram illustrating a method for sharing components.

Referring now to FIG. 6, an exemplary coexistence system is illustrated. The Bluetooth sub-client 272 is shown interfacing with the WLAN sub-client. When the WLAN sub-client is in an active state, the WLAN sub-client may abort transmissions and transfer shared component access to the Bluetooth sub-client. When the MAN sub-client is in a low power state, i.e. a low power sub-client 252, and the WiMAX sub-client is in an active state, i.e. the active sub-client 254, the Bluetooth sub-client 272 may send a priority request 274 to the WLAN low power sub-client 252 for access to the shared components. This request 274 may include setting a clear channel assessment (CCA) signal of the WLAN sub-client high. When a clear channel assessment signal is held high, the WiMAX active sub-client 254 may abort active state transmissions of units of data (packets). The WiMAX re-transmits the units of data at a later scheduled transmission period.

Within the predetermined time 257, the active (WiMAX) sub-client 254 sends an acknowledge signal 258. The low power (WLAN) sub-client 252 then sends an acknowledgement signal 276 to the Bluetooth sub-client 272, which performs the intended functions 278 (e.g., transmitting or receiving on the shared components.). The low power sub-client 252, within the predetermined expiration time 260, sends a signal 280 indicating that the low power sub-client 252 is resuming control of the components. The low power sub-client 252 then sends a transmit/receive completed message 264 to the active sub-client 254 also within the predetermined expiration time 260. The active sub-client sends an acknowledgement 266. The predetermined expiration time 260 corresponds to the regularly scheduled MAP and thus allows the active WiMAX sub-client 254 to avoid deregistration through interference from other sub-client operations.

To further ensure that the WiMAX sub-client will send or receive during the regularly scheduled MAP period without interference, the WiMAX sub-client may pass an offset value to the Bluetooth sub-client to offset Bluetooth transmit/receive processes. Alternately, the Bluetooth sub-client may send a Bluetooth transmission/reception schedule to the WiMAX sub-client during a prescheduled time interval. The coexistence control module may rearrange transmissions of the WiMAX sub-client to minimize Bluetooth WiMAX interference.

When both WLAN and WiMAX sub-client modules are active at the same time, the coexistence control module 31 checks that interference between WiMAX and WLAN sub-client modules is minimized. This includes checking that the WLAN sub-client module is associated with a particular AP and restricting the WLAN sub-client module transmissions to a portion of a WiMAX uplink period. Both WLAN and WiMAX sub-client modules may also fragment transmitted units of data or lower power output to ensure minimal interference. Also, one of the WLAN, WiMAX, and Bluetooth sub-clients may selectively reduce signal power to decrease signal interference with signals from another one of the sub-client modules.

Important to note is that alternate embodiments of the present disclosure do not require the WLAN sub-client to wake up to service the Bluetooth sub-client. Further, the coexistence control module 31 may run constantly to track or detect which sub-client(s) is in sleep mode and which sub-client(s) is in active mode. Based on this coexistence control module 31, sharing of common resources may simply be achieved between the sub-client that requests the resource and the active sub-client.

Figure 7:
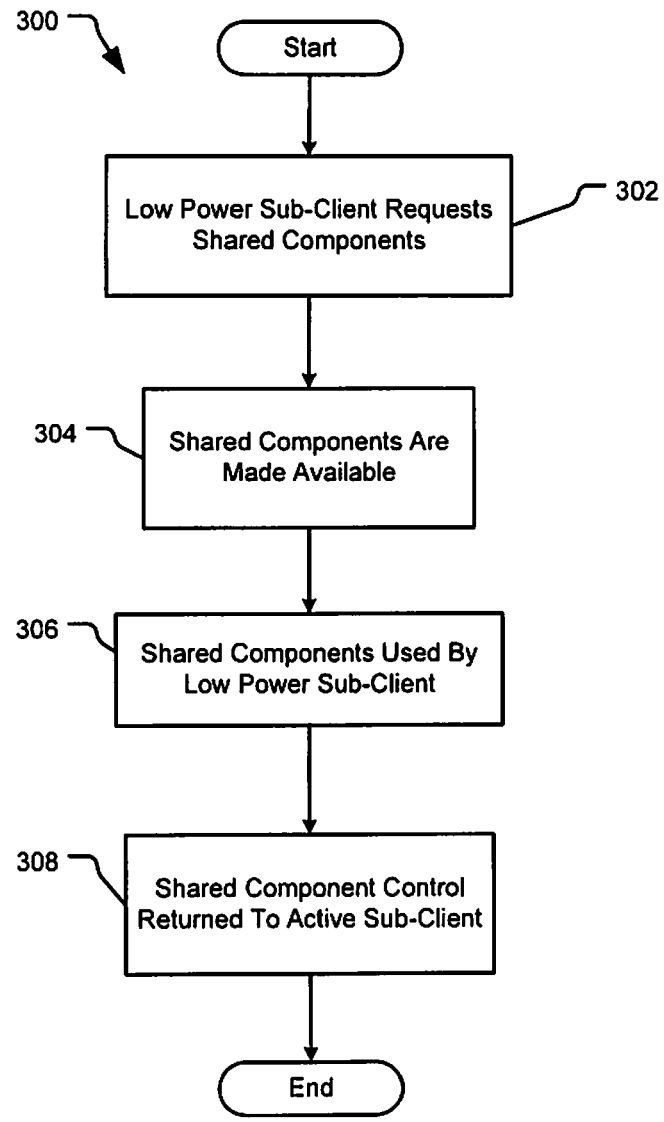
FIG. 7 is a block diagram illustrating a method for supporting coexistence of multiple sub-clients.

Referring now to FIG. 7, a method 300 for managing coexistence of multiple sub-client modules is illustrated. In step 302, the low power (inactive) sub-client module requests components from the active sub-client module. In step 304, the active sub-client module selectively transitions to a sleep state or pattern and/or reserves a channel for a fixed amount of time with the coexistence control module. The active sub-client module then sends indication back to the low power sub-client module that the components are available. In step 306, the low power sub-client module transmits/receives with or through the components; and in step 308, within a predetermined time duration, the low power sub-client module hands back components to the active sub-client module. The active sub-client module and/or the low power sub-client module may be one of WiMAX, WLAN, or Bluetooth.

Prior to or during the sleep state of an active WiMAX sub-client module, busy pattern is transmitted to the WiMAX base station. A base station scheduler (not shown) may use the busy pattern to schedule transmissions (uplink and downlink) to and from the active WiMAX sub-client module. The busy pattern may include: Start frame, Offset, Interval, Busy duration, and Busy because of Bluetooth or WLAN. This pattern generally indicates a Bluetooth sub-client module or WLAN sub-client module is using the shared components.

When one sub-client module is expecting a downlink transmission, the sub-client module may set a carrier detect signal in the other sub-client module, thereby preventing the other sub-client module from transmitting and causing the other sub-client module to enter a random back-off state. Low power sub-client modules may also hold an "Abort Transmit" signal in the active sub-client module to check that the active sub-client module aborts transmission when the low power sub-client modules are receiving beacons, etc.

The WLAN sub-client module may detect a WiMAX signal either through a repeated MAP transmission or through an indication from the WiMAX sub-client module and inform the WLAN AP that it is experiencing interference in the channel and that the AP should switch to a new channel. Repeated MAP transmissions may be detected based on frame duration for WiMAX, which is typically 5 ms. The uplink and/or downlink duty cycle could be ⅔ or ½ of the frame duration. Based on the frame duration interference pattern, the WLAN base station or access point can detect the presence of a WiMAX system. Also the WLAN sub-client or the co-existence control module could implement a preamble detector to detect the transmission of WiMAX.

If the AP does not switch to a new channel, the WLAN sub-client module scans for APs on different channels. The channel selection may be based on measured signal-to-noise ratio (SNR) during WiMAX interference, which is a periodic interference. The channel selection may also be based on some average signal-to-noise ratio over a greater time duration than the WiMAX time frame duration.

Figure 8:
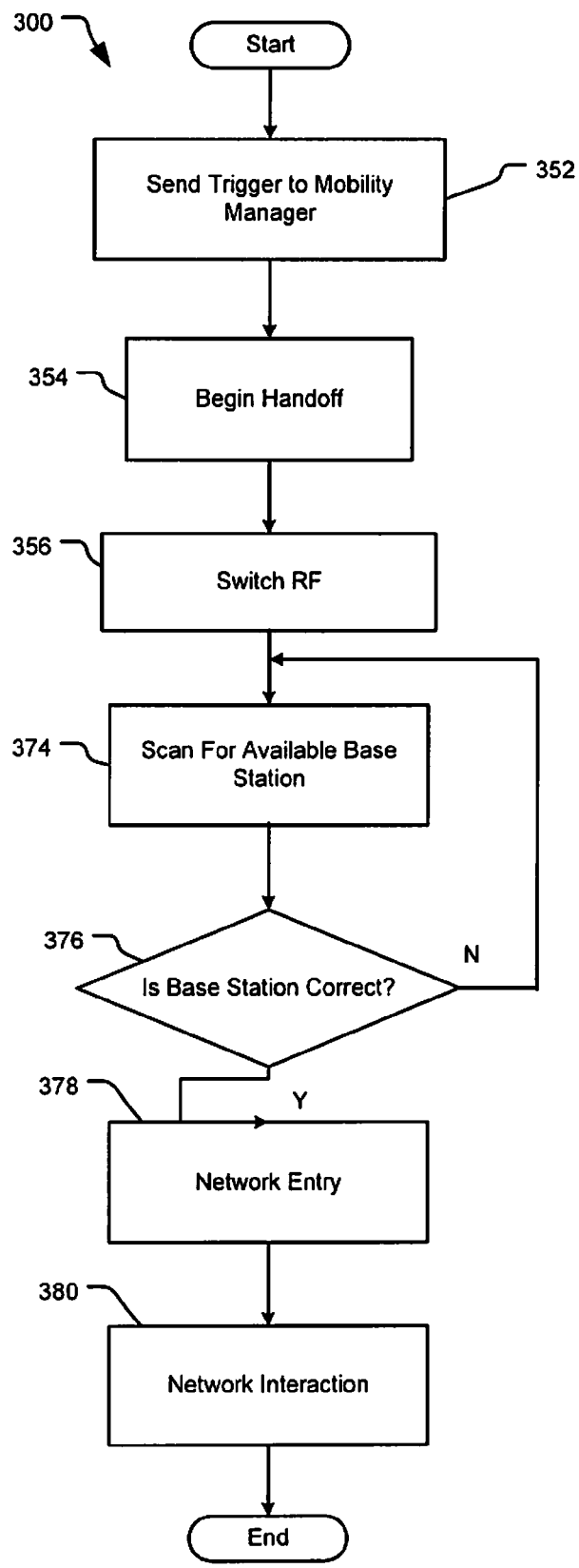
FIG. 8 is a block diagram illustrating a method for handoff of components between multiple sub-clients.

Referring now to FIG. 8, a handoff method 350 is illustrated where the sub-client module (e.g. WLAN sub-client module) after reaching a low signal quality threshold with the network, initiates handoff transmissions to the other sub-client module (e.g. WiMAX sub-client module). For seamless handoff, no units of data (e.g. voice-over Internet protocol (VoIP), streaming video, or video conferencing units of data) should be dropped.

Figure 9:
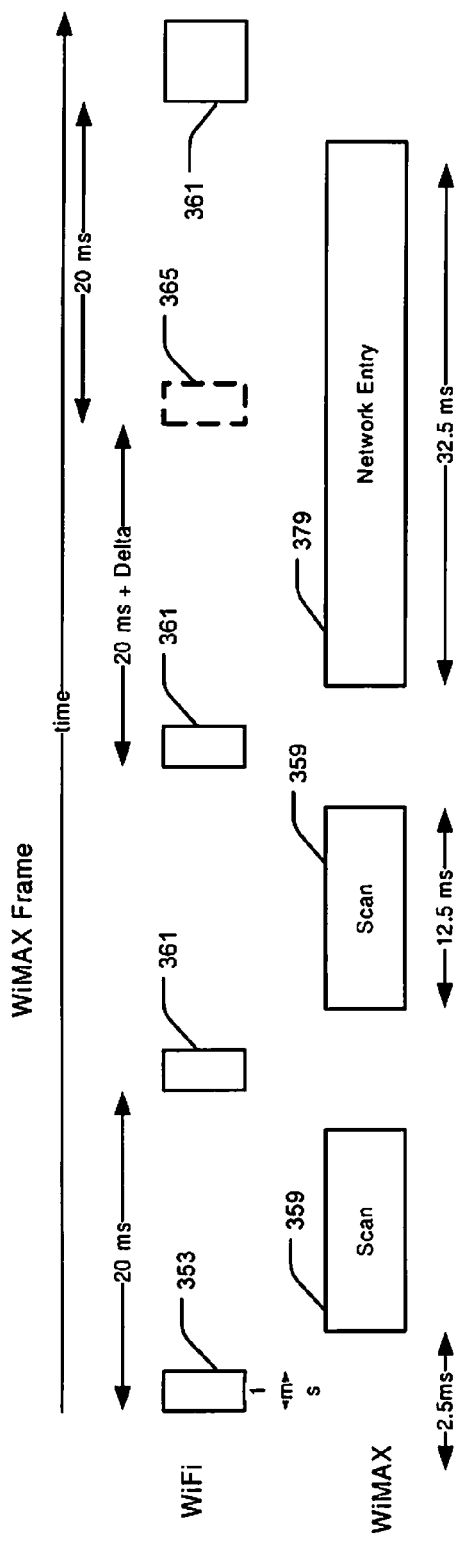
FIG. 9 is WiMAX signal time frame diagram including scheduled WLAN activation periods.

Referring now to FIG. 9 in view of FIG. 8, a portion of a WiMAX operation time frame is illustrated. In step 352, when transmit/receive signal quality drops below a disconnect (i.e., link lost) threshold for the WLAN sub-client module, the WLAN sub-client module sends a trigger 353 to the network (or an AP communicating with a WiMAX network). The trigger 353 is sent to a WiMAX base station to indicate that the WLAN sub-client module is initiating a handoff to the WiMAX sub-client module (i.e. that a WiMAX client wants to enter the network.). In step 354, after the WLAN sub-client module receives a confirmation from the network (or the AP), the WLAN sub-client module begins the handoff to the WiMAX sub-client module.

In step 356, the radio frequency subsystem switches from WLAN frequency to a WiMAX frequency. In step 374, the WiMAX sub-client module initiates a scan 359 for available WiMAX base stations within selectively determined sleep pattern openings 361. The openings 361 may be dedicated by the WLAN sub-client module through an Unsolicited Automatic Power Save Delivery (U-APSD) protocol.

Figure 10:
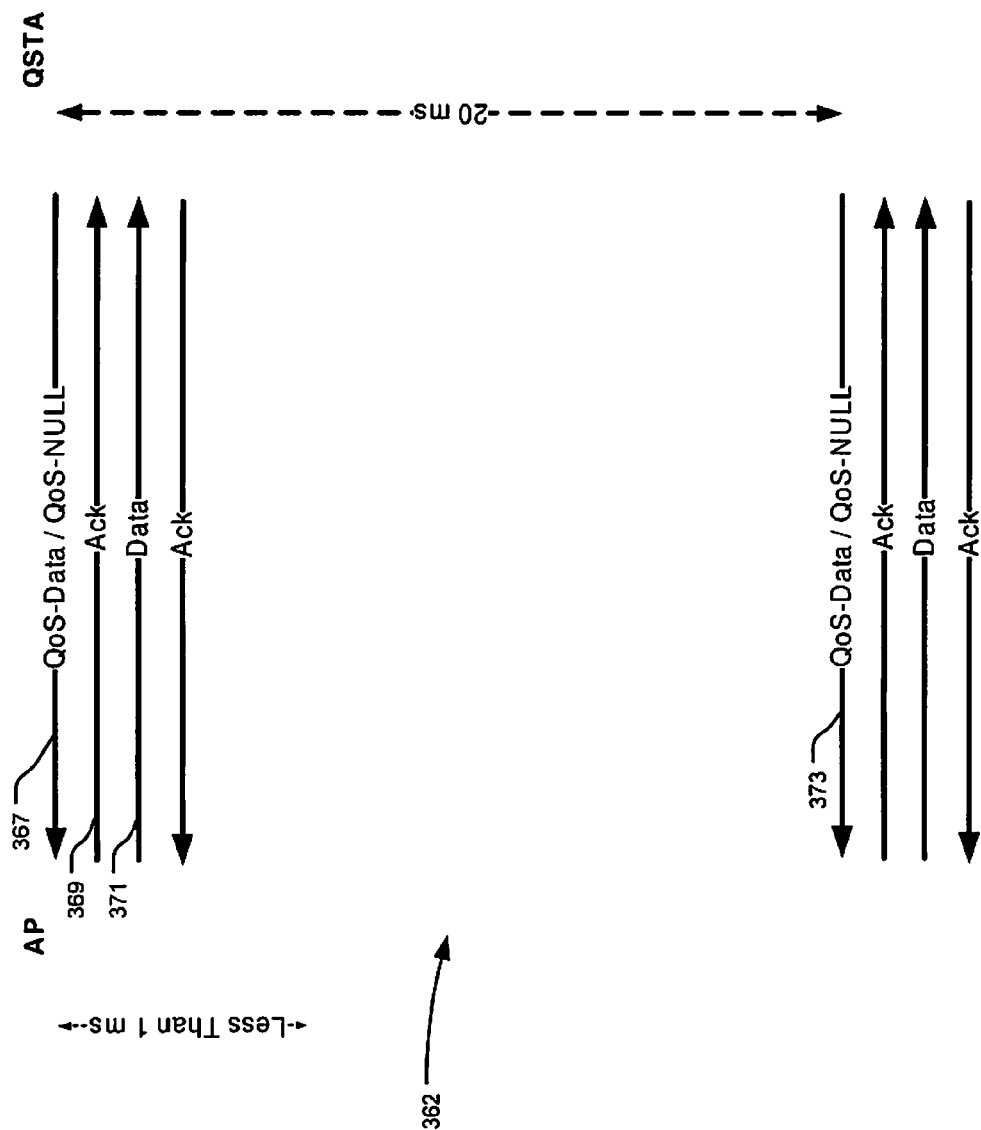
FIG. 10 is a protocol diagram for Unsolicited Automatic Power Save Delivery (U-APSD) for a WLAN sub-client.

Referring now to FIG. 10, a U-APSD protocol 362 is illustrated for a WLAN sub-client module to transmit voice signals at low power. A WLAN sub-client module quality of service enhanced station (QSTA) (not shown) sends quality of service (QoS) signal data 367 to an AP. The AP acknowledges the signal (i.e., sends an ACK 369) and sends VoIP data 371 to the QSTA. The WLAN wakes up after a predetermined time (e.g., 20 ms) and sends another QoS data signal 373, etc.

Referring again to FIGS. 8 and 9, step 374 may include scanning for a single base station or all available base stations. In step 376, the WiMAX sub-client module or the mobility manager module checks that received base station information matches desired base station information. For a negative response, step 374 is repeated. Otherwise, in step 378, the WiMAX sub-client module starts a network entry procedure 379. During network entry, the WiMAX sub-client module receives a downlink MAP for receiving data and an uplink MAP for transmitting data. The sleep pattern openings 361 are not synchronous to the downlink MAP or uplink MAP reception. The WLAN sub-client module therefore modifies the sleep openings accordingly.

When the uplink MAP indicates a transmit opportunity for the WiMAX sub-client module, and the WLAN station is transmitting units of data during a sleep pattern opening, the sleep pattern opening transmission 365 may be skipped. WiMAX transmissions may also be skipped during important WLAN operations for later retransmission. In step 380, after completing network entry, the WiMAX sub-client module carries downlink and uplink traffic. The WiMAX sub-client module may therefore remain synchronized with a base station while a WLAN sub-client module is receiving and transmitting data.

Figure 11A:
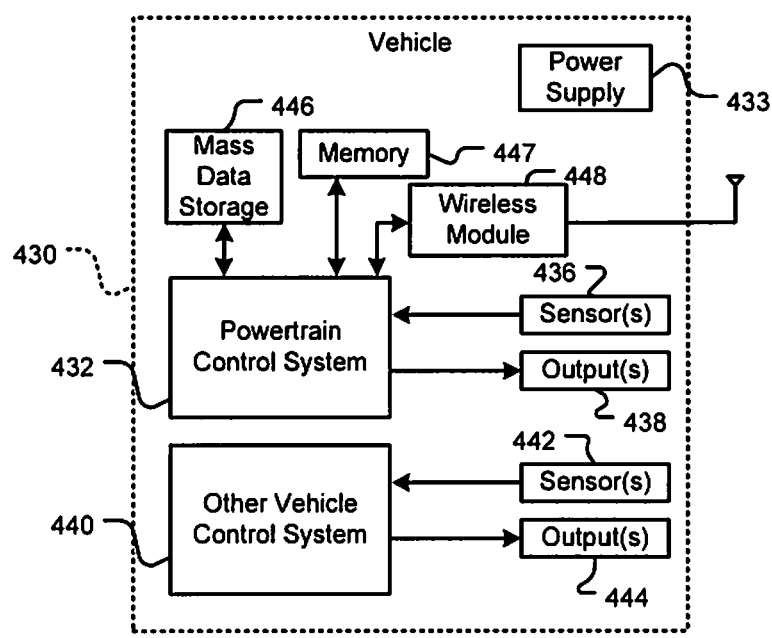
FIG. 11A is a functional block diagram of a vehicle control system.

Referring now to FIGS. 11A-11D, various exemplary implementations of the present disclosure are shown. Referring now to FIG. 11A, the present disclosure may implement and/or be implemented in a wireless module 448 of a vehicle 430. A powertrain control system 432 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present disclosure may also be implemented in other control systems 440 of the vehicle 430. The control system 440 may likewise receive signals from input sensors 442 and/or output control signals to one or more output clients 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage clients for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a wireless system via wireless module 448. Vehicle 430 may also include a power supply 433.

Figure 11B:
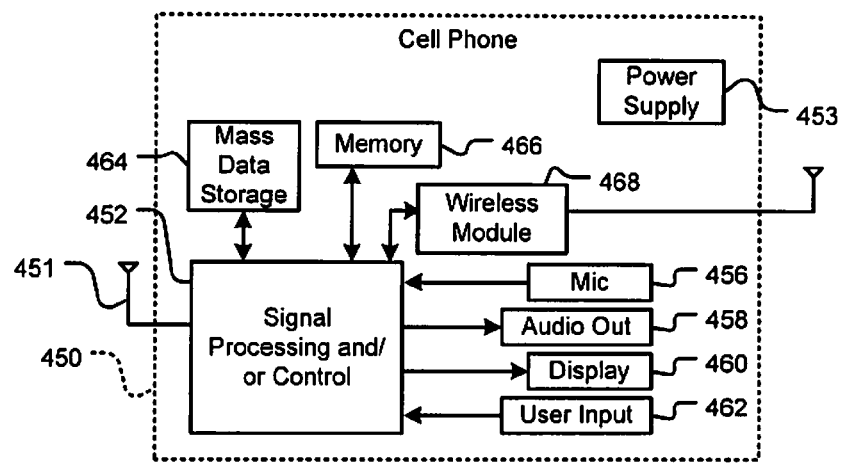
FIG. 11B is a functional block diagram of a cellular phone.

Referring now to FIG. 11B, the present disclosure can be implemented in a cellular phone 450 that may include a cellular antenna 451. The present disclosure may implement and/or be implemented in a wireless module 468. In some implementations, the cellular phone 450 includes a microphone 456, an audio output 458 such as a speaker and/or audio output jack, a display 460 and/or an input client 462 such as a keypad, pointing client, voice actuation and/or other input client. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage clients for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a wireless system via wireless module 468. Cellular phone 450 may also include a power supply 453.

Figure 11C:
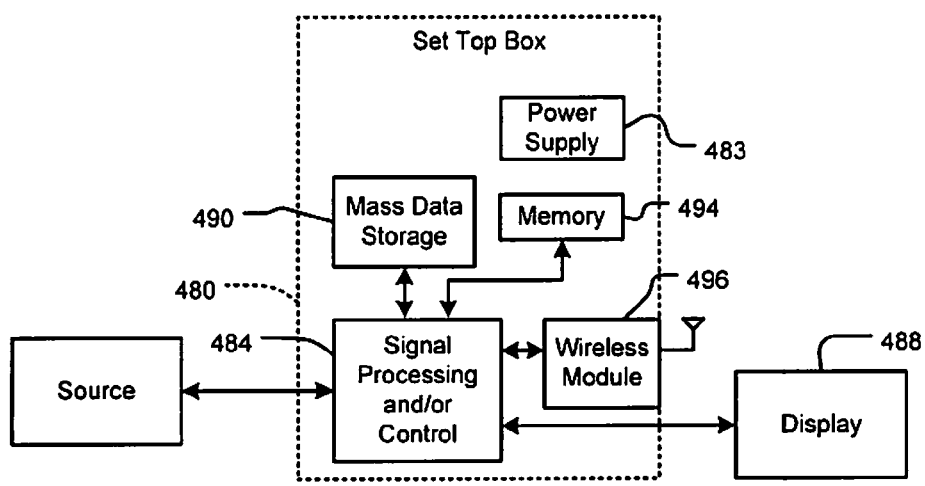
FIG. 11C is a functional block diagram of a set top box.

Referring now to FIG. 11C, the present disclosure can be implemented in a set top box 480. The present disclosure may implement and/or be implemented in a wireless module 496. The set top box 480 receives signals from a source such as a broadband source and outputs standard and/or high definition audio/video signals suitable for a display 488 such as a television and/or monitor and/or other video and/or audio output clients. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage clients for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a wireless system via wireless module 496. Set top box 480 may also include a power supply 483.

Figure 11D:
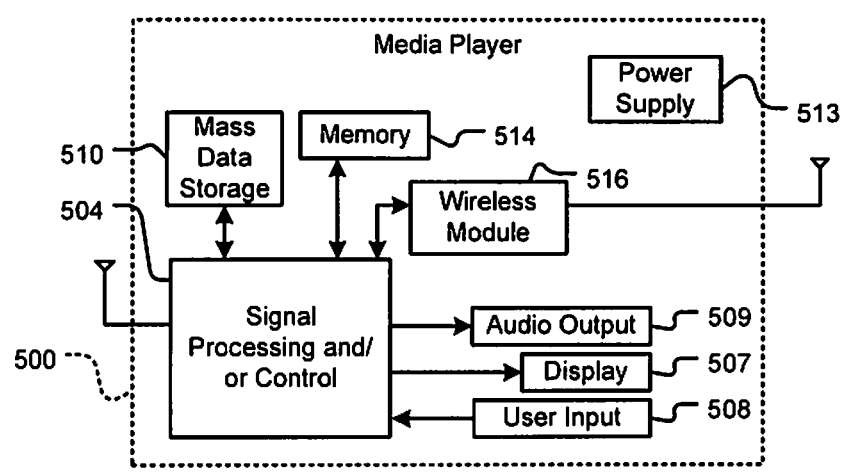
FIG. 11D is a functional block diagram of a media player.

Referring now to FIG. 11D, the present disclosure can be implemented in a media player 500. The present disclosure may implement and/or be implemented in a wireless module 516. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage clients for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a wireless system via wireless module 516. Media player 500 may also include a power supply 513. Still other implementations in addition to those described above are contemplated.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A network interface comprising:
 a radio frequency system comprising a component, wherein the component is configured for communication with an access point;
 a first client module communicates with the access point in accordance with a first wireless communication standard;
 a second client module communicates with the access point in accordance with a second wireless communication standard;
 a third client module communicates with the access point in accordance with a third wireless communication standard; and
 a control module in communication with the second client module and the third client module,
 wherein
  the first wireless communication standard is different than the second wireless communication standard and the third wireless communication standard,
  the second wireless communication standard is different than the third wireless communication standard,
  the first client module, the second client module and the third client module are configured to share the component of the radio frequency system, such that during respective periods of time the first client module, the second client module, and the third client module communicate with the access point via the component,
  the first client module is configured to transmit a request signal to the second client module while (i) the second client module is in an idle state, and (ii) the third client module is in an active state,
  the request signal requests access to the component,
  the third client module is configured to transmit first data to the access point while in the active state,
  the second client module is configured to forward the request signal to the third client module,
  the third client module is configured to, in response to the request signal, (i) abort the transmitting of the first data to the access point, and (ii) transmit a first acknowledgement signal to the second client module,
  the second client module is configured to transmit a second acknowledgement signal to the first client module in response to the first acknowledgement signal,
  the first client module is configured to, in response to the second acknowledgement signal, transmit to or receive from the access point second data, and
  the second client module is configured to
   transmit a reserve signal to the control module to reserve the component of the radio frequency system,
    wherein the reserve signal indicates reserving the component during a period when the third client module is to receive a mobile signal, and
    wherein the mobile signal indicates send times and receive times allocated for the third client module, and
   skip transmissions during the period when the third client module is to receive the mobile signal.

2. The network interface of claim 1, wherein:
 the second client module is configured to transmit an indication signal to the first client module;
 the indication signal indicates to the first client module that control of the component is to return to the second client module or the third client module; and the control of the component is to return to the second client module or the third client module within a predetermined period from the transmission of the first acknowledgement signal.

3. The network interface of claim 2, wherein:
the predetermined period is based on a period, during which the third client module is to receive the mobile signal, to avoid deregistration of the third client module with the access point due to interference associated with communication between the first client module and the access point; and
the mobile signal indicates send times and receive times allocated for the first client module.

4. The network interface of claim 1, wherein the control module is configured to control access of the first client module, the second client module, and the third client module to the component of the radio frequency system.

5. The network interface of claim 1, wherein the second client module is configured to:
determine a quality level of a first data signal transmitted from the second client module to the access point; and
based on the quality level of the first data signal transmitted from the second client module to the access point, handoff access to the component from the second client module to the third client module to allow the third client module to transmit a second data signal to the access point via the component.

6. The network interface of claim 1, wherein:
the second client module is configured to transmit a first data signal to the access point on a first channel;
the third client module is configured to transmit a second data signal to a network or the access point; and
the second client module is configured to (i) detect the second data signal, (ii) inform the access point of interference between the first data signal and the second data signal, and (iii) based on the interference, signal the access point to switch to a channel different than the first channel.

7. The network interface of claim 1, wherein the control module is configured to (i) determine a first priority level of the second client module, (ii) determine a second priority level of the third client module, and (iii) based on the first priority level and the second priority level:
control the second client module to be in an active state to permit communication between the second client module and the radio frequency system; and
control the third client module to be in a sleep state to prevent communication between the second client module and the radio frequency system.

8. The network interface of claim 7, wherein:
the first client module is in communication with the radio frequency system via the second client module; and
the control module is configured to
prevent interference between (i) signals transmitted between the first client module and a network, and (ii) signals transmitted between the third client module and the network, and
when preventing the interference, rearrange transmissions of the first client module and the third client module.

9. The network interface of claim 1, wherein the first wireless communication standard, the second wireless communication standard, and the third wireless communication standard are each (i) a wireless local area network protocol, (ii) a packet-based protocol of a wireless personal area network, or (iii) a protocol enabling wireless broadband access for a last mile of communication.

10. The network interface of claim 1, wherein the third client module is configured to remain synchronized with a base station while the second client module receives and transmits third data via the radio frequency system.

11. The network interface of claim 1, wherein:
the first client module is in communication with the radio frequency system via the second client module; and
the third client module is configured to, while the first client module uses the radio frequency system, maintain registration with (i) the access point, or (ii) a base station.

12. The network interface of claim 1, wherein:
the first client module is in communication with the radio frequency system via the second client module;
the third client module is configured to transmit an offset value to the first client module;
the first client module is configured to avoid interference with the mobile signal by transmitting and receiving based on the offset value;
the mobile signal indicates send and receive times for the third client module; and
the third client module is configured to receive the mobile signal from a network.

13. A method of communicating, via a first client module, a second client module, and a third client module, with an access point using a component of a radio frequency system, wherein the first client module communicates with the access point in accordance with a first wireless communication standard, wherein the second client module communicates with the access point in accordance with a second wireless communication standard, wherein the third client module communicates with the access point in accordance with a third wireless communication standard, wherein the first wireless communication standard is different than the second wireless communication standard and the third wireless communication standard, and wherein the second wireless communication standard is different than the third wireless communication standard, the method comprising:
controlling the first client module, the second client module and the third client module to communicate with the access point via the component during respective periods of time;
transmitting a request signal from the first client module to the second client module while (i) the second client module is in an idle state, and (ii) the third client module is in an active state, wherein the request signal requests access to the component;
transmitting first data from the third client module to the access point while the third client module is in the active state;
forwarding the request signal from the second client module to the third client module;
in response to the request signal, (i) aborting the transmitting of the first data from the third client module to the access point, and (ii) transmitting a first acknowledgement signal from the third client module to the second client module;
in response to the first acknowledgement signal, transmitting a second acknowledgement signal from the second client module to the first client module;
in response to the second acknowledgement signal and via the first client module, transmitting to or receiving from the access point second data;
transmitting, via the second client module, a reserve signal to a control module to reserve the component of the radio frequency system, wherein the reserve signal indicates reserving the component during a period when the third client module is to receive a mobile signal, and wherein the mobile signal indicates send times and receive times allocated for the third client module; and skipping, via the second client module, transmissions during the period when the third client module is to receive the mobile signal.

14. The method of claim 13, further comprising transmitting an indication signal from the second client module to the first client module, wherein:

the indication signal indicates to the first client module that control of the component is to return to the second client module or the third client module; and the control of the component is to return to the second client module or the third client module within a predetermined period from the transmission of the first acknowledgement signal.

15. The method of claim 14, wherein:

the predetermined period is based on a period, during which the third client module is to receive the mobile signal, to avoid deregistration of the third client module with the access point due to interference associated with communication between the first client module and the access point; and the mobile signal indicates send times and receive times allocated for the first client module.

16. The method of claim 13, further comprising:

determine a quality level of a first data signal transmitted from the second client module to the access point; and based on the quality level of the first data signal transmitted from the second client module to the access point, handoff access to the component from the second client module to the third client module to allow the third client module to transmit a second data signal to the access point via the component.

17. The method of claim 13, further comprising transmitting a first data signal from the second client module to the access point on a first channel;

transmitting a second data signal from the third client module to a network or the access point;

detecting the second data signal at the second client module;

informing the access point of interference between the first data signal and the second data signal; and based on the interference, signaling the access point to switch to a channel different than the first channel.

* * * * *